(12) United States Patent
Lahorani et al.

(10) Patent No.: US 10,783,142 B2
(45) Date of Patent: Sep. 22, 2020

(54) EFFICIENT DATA RETRIEVAL IN STAGED USE OF IN-MEMORY CURSOR DURATION TEMPORARY TABLES

(71) Applicant: Oracle International Corporation, Redwood Shores, CA (US)

(72) Inventors: Janaki Latha Lahorani, San Ramon, CA (US); Mohamed Ziauddin, Pleasanton, CA (US); You Jung Kim, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 167 days.

(21) Appl. No.: 15/268,522

(22) Filed: Sep. 16, 2016

(65) Prior Publication Data
US 2017/0116272 A1    Apr. 27, 2017

Related U.S. Application Data

(60) Provisional application No. 62/245,869, filed on Oct. 23, 2015.

(51) Int. Cl.
*G06F 16/24* (2019.01)
*G06F 16/2453* (2019.01)
*G06F 16/2455* (2019.01)

(52) U.S. Cl.
CPC .... *G06F 16/24542* (2019.01); *G06F 16/2455* (2019.01); *G06F 16/24539* (2019.01); *G06F 16/24561* (2019.01)

(58) Field of Classification Search
CPC ......... G06F 17/30463; G06F 17/30457; G06F 17/30477; G06F 17/30501; G06F 16/24542; G06F 16/24539; G06F 16/24561; G06F 16/2455
See application file for complete search history.

(56) References Cited

U.S. PATENT DOCUMENTS

| | | |
|---|---|---|
| 5,359,724 A | 10/1994 | Earle |
| 5,367,677 A | 11/1994 | Stanfill |
| 5,546,571 A | 8/1996 | Shan |
| 5,822,750 A | 10/1998 | Jou |
| 5,848,408 A | 12/1998 | Jackobsson |
| 5,905,985 A | 5/1999 | Malloy |
| 5,915,249 A | 6/1999 | Spencer |

(Continued)

OTHER PUBLICATIONS

Louiqa Raschid et al., "A Parallel Processing Strategy for Evaluating Recursive Queries", dated Aug. 1986, 8 pages.

(Continued)

*Primary Examiner* — Kris E Mackes
*Assistant Examiner* — Tiffany Thuy Bui
(74) *Attorney, Agent, or Firm* — Hickman Palermo Becker Bingham LLP

(57) ABSTRACT

Techniques are presented herein for storing cursor duration temporary tables in memory of nodes in a clustered database system in association with iterations of an iterative query operation. The techniques involve associating a portion of memory with one or more iteration values. The iteration values indicate which iterations correspond to data that is stored in the portion of memory. When data is requested for a particular iteration, portions of memory are checked to determine if it stores the particular iteration.

14 Claims, 4 Drawing Sheets

(56) References Cited

U.S. PATENT DOCUMENTS

| | | |
|---|---|---|
| 5,943,666 A | 8/1999 | Kleewein |
| 5,960,428 A | 9/1999 | Lindsay |
| 6,298,342 B1 | 10/2001 | Graefe |
| 6,317,750 B1 | 11/2001 | Tortolani et al. |
| 6,341,281 B1 | 1/2002 | MacNicol |
| 6,345,267 B1 | 2/2002 | Lohman |
| 6,353,828 B1 | 3/2002 | Ganesh |
| 6,397,195 B1 | 5/2002 | Pinard et al. |
| 6,397,204 B1 | 5/2002 | Liu |
| 6,405,208 B1 | 6/2002 | Raghavan et al. |
| 6,385,604 B1 | 7/2002 | Bakalash et al. |
| 6,446,063 B1 | 9/2002 | Chen |
| 6,460,045 B1 | 10/2002 | Aboulnaga et al. |
| 6,484,179 B1 | 11/2002 | Roccaforte |
| 6,529,896 B1 | 3/2003 | Leung et al. |
| 6,618,729 B1 | 9/2003 | Bhashyam et al. |
| 6,711,563 B1 | 3/2004 | Koskas |
| 6,775,682 B1 | 8/2004 | Ballamkonda |
| 6,959,304 B1 | 10/2005 | Teig et al. |
| 6,965,891 B1 | 11/2005 | Jakobsson |
| 7,028,046 B2 | 4/2006 | Anjur et al. |
| 7,103,590 B1 | 9/2006 | Murthy |
| 7,146,370 B1 | 12/2006 | Klindt |
| 7,174,327 B2 | 2/2007 | Chau |
| 7,324,991 B1 | 1/2008 | Anjur |
| 7,337,163 B1 | 2/2008 | Srinivasan |
| 7,366,730 B2 | 4/2008 | Greenfield et al. |
| 7,392,248 B2 | 6/2008 | Bakalash |
| 7,467,127 B1 | 12/2008 | Baccash et al. |
| 7,617,312 B2 | 11/2009 | Tummalapalli |
| 7,725,425 B2 | 5/2010 | Smartt |
| 7,734,652 B2 | 6/2010 | Tamayo |
| 7,769,733 B2 | 8/2010 | Chen et al. |
| 7,774,303 B2 | 8/2010 | Shoup |
| 7,797,320 B2 | 9/2010 | Thomsen |
| 8,001,112 B2 | 8/2011 | Dombroski et al. |
| 8,041,670 B2 | 10/2011 | Bakalash |
| 8,176,265 B2 | 5/2012 | Coon |
| 8,200,612 B2 | 6/2012 | Soylemez |
| 8,209,208 B2 | 6/2012 | Kearney et al. |
| 8,311,975 B1 | 11/2012 | Gonsalves |
| 8,396,325 B1 | 3/2013 | Kwatra |
| 8,554,761 B1 | 10/2013 | Ahmed |
| 8,660,985 B2 | 2/2014 | Wang |
| 8,788,453 B2 | 7/2014 | Bakalash |
| 8,799,209 B2 | 8/2014 | Bakalash |
| 9,092,484 B1 * | 7/2015 | Abraham ............ G06F 17/30463 |
| 9,177,027 B2 | 11/2015 | Kitsuregawa |
| 9,183,254 B1 | 11/2015 | Cole |
| 9,324,036 B1 * | 4/2016 | Iyer ..................... G06N 7/005 |
| 9,971,808 B2 | 5/2018 | Kamath |
| 10,091,061 B1 | 10/2018 | Peterson |
| 2002/0095397 A1 | 7/2002 | Koskas |
| 2002/0095421 A1 | 7/2002 | Koskas |
| 2003/0208484 A1 | 11/2003 | Chang |
| 2004/0153435 A1 | 8/2004 | Gudbjartsson et al. |
| 2004/0225639 A1 | 11/2004 | Jakobsson |
| 2005/0033741 A1 | 2/2005 | Dombroski et al. |
| 2005/0131880 A1 * | 6/2005 | Yoaz ..................... G06F 7/00 |
| 2006/0026115 A1 | 2/2006 | Ahmed |
| 2006/0080285 A1 * | 4/2006 | Chowdhuri ......... G06F 17/30445 |
| 2006/0101001 A1 | 5/2006 | Lindsay |
| 2006/0184519 A1 | 8/2006 | Smartt |
| 2006/0200772 A1 | 9/2006 | Dhanapal |
| 2006/0235818 A1 | 10/2006 | Muras |
| 2006/0235823 A1 | 10/2006 | Chong |
| 2007/0027860 A1 | 2/2007 | Bestgen |
| 2007/0083489 A1 | 4/2007 | Lawande |
| 2007/0233648 A1 | 10/2007 | Zuzarte |
| 2007/0239673 A1 | 10/2007 | Barsness |
| 2007/0239691 A1 | 10/2007 | Ordonez |
| 2007/0250473 A1 | 10/2007 | Larson |
| 2007/0283356 A1 | 12/2007 | Du |
| 2008/0059415 A1 | 3/2008 | Bakalash |
| 2008/0162409 A1 | 7/2008 | Meijer |
| 2008/0172354 A1 | 7/2008 | Zuarte |
| 2008/0215544 A1 | 9/2008 | Galindo-Legaria |
| 2008/0306903 A1 | 12/2008 | Larson |
| 2009/0112793 A1 | 4/2009 | Ahemd |
| 2009/0182720 A1 | 7/2009 | Cain et al. |
| 2009/0265335 A1 | 10/2009 | Hoffman |
| 2009/0281985 A1 | 11/2009 | Aggarwal |
| 2010/0088325 A1 | 4/2010 | Goldstein |
| 2010/0191716 A1 | 7/2010 | Chen |
| 2010/0211577 A1 * | 8/2010 | Shimizu ............ G06F 17/30454<br>707/752 |
| 2010/0299337 A1 | 11/2010 | Aurin |
| 2010/0299367 A1 | 11/2010 | Chakrabarti et al. |
| 2011/0010139 A1 | 1/2011 | Fuhrmann |
| 2011/0040745 A1 | 2/2011 | Zaydman |
| 2011/0047364 A1 | 2/2011 | Koju |
| 2011/0055246 A1 | 3/2011 | Le Biannic et al. |
| 2011/0137917 A1 | 6/2011 | Boland et al. |
| 2011/0145244 A1 | 6/2011 | Kim et al. |
| 2011/0173164 A1 | 7/2011 | Bendel |
| 2011/0196857 A1 | 8/2011 | Chen |
| 2011/0252033 A1 | 10/2011 | Narang |
| 2011/0282864 A1 | 11/2011 | Collins |
| 2012/0036146 A1 * | 2/2012 | Annapragada .... G06F 17/30545<br>707/764 |
| 2012/0296883 A1 | 11/2012 | Ganesh |
| 2012/0296942 A1 | 11/2012 | Arora |
| 2013/0006965 A1 | 1/2013 | Barbas |
| 2013/0060547 A1 | 3/2013 | Beran et al. |
| 2013/0073538 A1 * | 3/2013 | Beerbower ....... G06F 17/30545<br>707/718 |
| 2013/0117255 A1 | 5/2013 | Liu |
| 2013/0173528 A1 | 7/2013 | Betawadkar |
| 2013/0198165 A1 | 8/2013 | Cheng |
| 2013/0262443 A1 * | 10/2013 | Leida ............... G06F 17/30427<br>707/722 |
| 2013/0275364 A1 | 10/2013 | Wang |
| 2013/0275365 A1 | 10/2013 | Wang |
| 2013/0275367 A1 | 10/2013 | Shuma |
| 2014/0052711 A1 | 2/2014 | Bamba et al. |
| 2014/0095526 A1 * | 4/2014 | Harada ............ G06F 17/30545<br>707/764 |
| 2014/0095534 A1 | 4/2014 | Aingaran |
| 2014/0099502 A1 | 4/2014 | Ziauddin |
| 2014/0101201 A1 | 4/2014 | Yan |
| 2014/0149480 A1 | 5/2014 | Catanzaro |
| 2014/0181072 A1 | 6/2014 | Wong |
| 2014/0181144 A1 * | 6/2014 | Kashiyama ....... G06F 17/30516<br>707/773 |
| 2014/0214796 A1 | 7/2014 | Barber |
| 2014/0280020 A1 | 9/2014 | Singamshetty |
| 2015/0019674 A1 | 1/2015 | Le Van Gong |
| 2015/0088795 A1 | 3/2015 | Golovashkin et al. |
| 2015/0088856 A1 | 3/2015 | Hunter et al. |
| 2015/0088885 A1 | 3/2015 | Hopeman, IV et al. |
| 2015/0088919 A1 | 3/2015 | Hunter et al. |
| 2015/0261820 A1 * | 9/2015 | Cheng ............... G06F 17/30466<br>707/718 |
| 2015/0278309 A1 * | 10/2015 | Harada ................ G06F 7/58<br>707/718 |
| 2015/0379077 A1 * | 12/2015 | Grosse ............ G06F 17/30445<br>707/718 |
| 2016/0034521 A1 * | 2/2016 | Lumby ............ G06F 17/30371<br>707/690 |
| 2016/0179889 A1 | 6/2016 | Chiang |
| 2016/0232206 A1 * | 8/2016 | Hayamizu ......... G06F 17/30477 |
| 2016/0378751 A1 | 12/2016 | Kamath |
| 2016/0378754 A1 | 12/2016 | Kamath |
| 2016/0378796 A1 | 12/2016 | Hopcroft |
| 2017/0116266 A1 | 4/2017 | Lahorani et al. |

OTHER PUBLICATIONS

Ashdown et al., "Oracle Database SQL Tuning Guide 12c Release 1(12.1)", dated May 2013, 566 pages.

U.S. Appl. No. 14/033,251, filed Sep. 20, 2013, Final Office Action, dated Dec. 21, 2015.

(56) References Cited

OTHER PUBLICATIONS

Hopeman, U.S. Appl. No. 14/033,251, filed Sep. 20, 2013, Notice of Allowance, dated Apr. 12, 2017.
Hunter, U.S. Appl. No. 14/033,358, filed Sep. 20, 2013, Final Office Action, dated Sep. 21, 2017.
Hunter, U.S. Appl. No. 14/033,358, filed Sep. 20, 2013, Interview Summary, dated May 1, 2017.
Hunter, U.S. Appl. No. 14/033,358, filed Sep. 20, 2013, Interview Summary, dated Dec. 21, 2016.
Hunter, U.S. Appl. No. 14/033,358, filed Sep. 20, 2013, Office Action, dated Mar. 9, 2017.
Hunter, U.S. Appl. No. 14/033,358, filed Sep. 20, 2017, Interview Summary, dated Dec. 11, 2017.
U.S. Appl. No. 14/033,251, filed Jan. 22, 2016, Interview Summary, dated Jan. 22, 2016.
Hopeman IV, U.S. Appl. No. 14/033,251, filed Sep. 20, 2013, Interview Summary, dated Dec. 27, 2016.
U.S. Appl. No. 14/033,251, filed Sep. 20, 2013, Final Office Action, dated Nov. 1, 2016.
U.S. Appl. No. 14/033,358, filed on Sep. 20, 2013, Office Action, dated Apr. 6, 2016.
U.S. Appl. No. 14/033,251, filed Sep. 20, 2013, Interview Summary, dated Aug. 16, 2016.
U.S. Appl. No. 14/033,251, filed Sep. 20, 2013, Office Action, dated May 27, 2016.
U.S. Appl. No. 14/033,358, filed Sep. 20, 2013, Advisory Action, dated Jan. 19, 2017.
U.S. Appl. No. 14/033,358, filed Sep. 20, 2013, Final Office Action, dated Oct. 5, 2016.
U.S. Appl. No. 14/033,358, filed Sep. 20, 2013, Final Office Action, dated Nov. 10, 2015.
U.S. Appl. No. 14/033,358, filed Sep. 20, 2013, Office Action, dated Apr. 6, 2016.
MSDN Library, "Dimension Set Entires", NAV 2013 Documentation, dated Nov. 21, 2012, Retrieved on Sep. 13, 2017, 22 pages.
Ziauddin, U.S. Appl. No. 15/268,528, filed Sep. 16, 2016, Interiview Summary, dated May 16, 2019.
Ziauddin, U.S. Appl. No. 15/268,528, filed Sep. 16, 2016, Advisory Action, dated May 21, 2019.
Lahorani, U.S. Appl. No. 15/268,519, filed Sep. 16, 2016, Notice of Allowance, dated May 23, 2019.
Ziauddin, U.S. Appl. No. 15/268,528, filed Sep. 16, 2016, Notice of Allowance, dated Jan. 29, 2020.
Ziauddin, U.S. Appl. No. 15/268,335, filed Sep. 16, 2016, Notice of Allowance, dated Jan. 24, 2020.

\* cited by examiner

QUERY 300

310 { WITH rw (fid, tid, cost, count)
     SELECT fid, tid, cost, 1
     FROM T WHERE fid = 1

320 { UNION ALL
     SELECT rw.fid, T.tid, rw.cost + T.cost, rw.count+1
     FROM T, rw
     WHERE T.fid = rw.tid AND rw.count < 10

330 { SELECT fid, tid, SUM(cost), SUM(count) FROM rw GROUP BY fid, tid

FIG 3.

EFFICIENT DATA RETRIEVAL IN STAGED USE OF IN-MEMORY CURSOR DURATION TEMPORARY TABLES

CROSS-REFERENCE TO RELATED APPLICATIONS; BENEFIT CLAIM

This application claims the benefit of Provisional Application 62/245,869, filed Oct. 23, 2015, the entire contents of which is hereby incorporated by reference as if fully set forth herein, under 35 U.S.C. § 119(e).

FIELD OF THE INVENTION

The present invention relates to processing queries in a multi-node database system. Specifically, the present invention relates to retrieving data from temporary tables to process multi-stage queries.

BACKGROUND

In a clustered database system, multiple "nodes" may have access to the same on-disk copy of a database. Typically, each node is a computing device with its own local memory and processors that are running one or more database instances. The database server instances on each of the nodes may receive queries to access the data. A query coordinator may assign work to be performed for the query among multiple slave processes running on the nodes in the database system, in order to process the query in parallel.

A complex query may be executed in multiple stages. During execution of the query, results generated by a stage may be used by another, subsequent stage. These results are temporarily stored in a table referred to herein as a "cursor duration temporary table." When a database system receives a query, it generates an execution plan for executing the query. If cursor duration temporary tables are required, then execution plan operations are written to refer to one or more temporary tables. A temporary table may be stored on a shared disk or in memory of one or more nodes so that they can be accessed in later stages.

Various approaches for storing cursor duration temporary tables, or portions thereof, into volatile memory to speed up query processing are described in U.S. patent application Ser. No. 15/268,519, entitled "In-Memory Cursor Duration Temp Tables," filed Sep. 16, 2016, referred to herein as the "In-Memory" application, the contents of which are incorporated herein in its entirety.

According to the approaches described in the In-Memory application, a portion of memory in each node of a clustered database system is allocated for storing in-memory cursor duration temporary tables. A slave process may be assigned one or more memory segments from the portion of memory for writing temporary table data. Any slave process running on the same node may read from the one or more memory segments. Nodes in the cluster may have access to one or more disks, which may be used to store temporary table data that do not fit in memory. One or more disk segments may be assigned to a slave process for writing excess data. Any slave process running on the same node may read from the one or more disk segments.

Some queries include iterative operations that reference results stored for prior iterations, while the final output of the query references results from multiple iterations. Results from all iterations may be stored in a single temporary table, with data indicating iteration values associated with each respective iteration. When data from a particular iteration is requested, the temporary table is scanned and a predicate is applied to find rows with the associated iteration value. However, this approach results in slower processing speeds since all the data from previous iterations are scanned, even ones that are not required for the operation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is a block diagram illustrating a query that includes an iterative operation;

DETAILED DESCRIPTION

Figure 1:
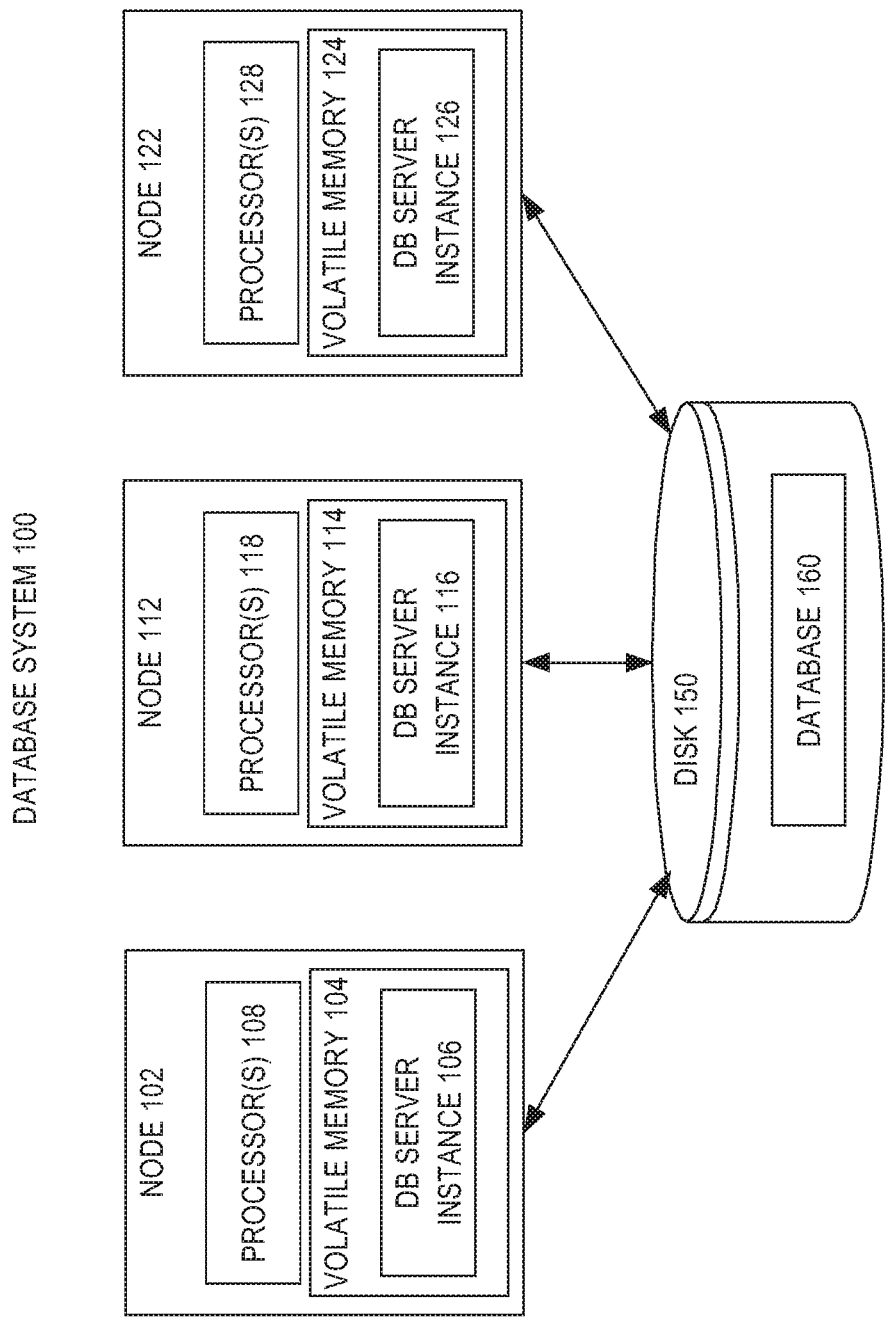
FIG. 1 is a block diagram illustrating a multi-node database system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are presented herein for storing iterations of an iterative query operation with the memory segments and disk segments in the nodes used for writing to cursor duration temporary tables According to an embodiment, a portion of memory in each node of a clustered database system is allocated for storing in-memory cursor duration temporary tables. Each portion of memory may be divided into one or more memory segments. When data for an iteration is written to a memory segment, an iteration value for the iteration is associated with the memory segment.

According to an embodiment, each node has access to a disk, where a portion of the disk is used for storing in-memory cursor duration temporary tables. Each disk portion may be divided into one or more disk segments. If data for an iteration does not fit in a memory segment, the excess data may be written to a disk segment. If data for an iteration is stored in a disk segment, the iteration value for the iteration is associated with the disk segment.

When an iteration is executed by the database system, it may require data from one or more previous iterations. In an embodiment, prior to reading data from a memory segment, iteration values associated with the memory segment are checked to determine whether the memory segment contains data for the one or more previous iterations. If the memory segment does not contain relevant data, then the database system does not have to read from that memory segment. If any disk segments were used to store data, the iteration values associated with the disk segments are checked to determine whether any disk segments contain data for the one or more previous iterations. If a disk segment does not contain relevant data, then the database system does not have to read from the disk segment.

In Memory Cursor Duration Temp Tables

Various database languages, such as SQL, support special-purpose constructs referred to herein as "cursors." During compilation of a query statement, the database server may perform a significant amount of preliminary work for the statement, such as parsing, semantic analysis, and query plan generation. A cursor stores much of the preliminary work. One set of information stored in a cursor includes the execution plan for performing the operations specified by the SQL statement.

An execution plan defines operations to be performed to execute a query and an order for performing the operations, known as plan operations. When a database instance receives a query, a query coordinator formulates a query execution plan for executing the query. The execution plan may specify that one or more plan operations are to be processed in parallel by one or more slave processes.

A plan operation may generate output that is stored in a temporary table for use during execution of another plan operation. If a query execution plan requires the use of temporary tables, one or more temporary tables are created and plan operations are written to reference the temporary tables.

In-memory cursor duration temporary tables refer to temporary tables that are stored primarily in local memory with excess data written to temporary disk segments. In a clustered database system, a portion of local RAM memory from each node in the cluster may be used to store in-memory temporary tables. The in-memory temporary may be divided into portions and each portion is stored in local memory of a node in the cluster.

System Overview

FIG. 1 depicts a multi-node database system on which an embodiment may be implemented. In the embodiment illustrated in FIG. 1, system 100 comprises three nodes, 102, 112, and 122. Although three nodes are shown in the present illustration, in other embodiments, system 100 may comprise more or fewer nodes.

Nodes 102, 112, and 122 have access to the same database 160. For the purpose of illustration, database 160 is shown as stored on a single shared disk 150, but in alternative embodiments may be spread across multiple disks to which each of nodes 102, 112, and 122 have access.

Nodes 102, 112, and 122 respectively have one or more processors 108, 118, and 128, and local RAM memory 104, 114, and 124. In addition, nodes 102, 112, and 122 are respectively executing database server instances 106, 116, and 126. While in the illustrated embodiment each node is executing a single database server instance, in alternative embodiments, a single node may execute more than one database server instance.

Figure 2:
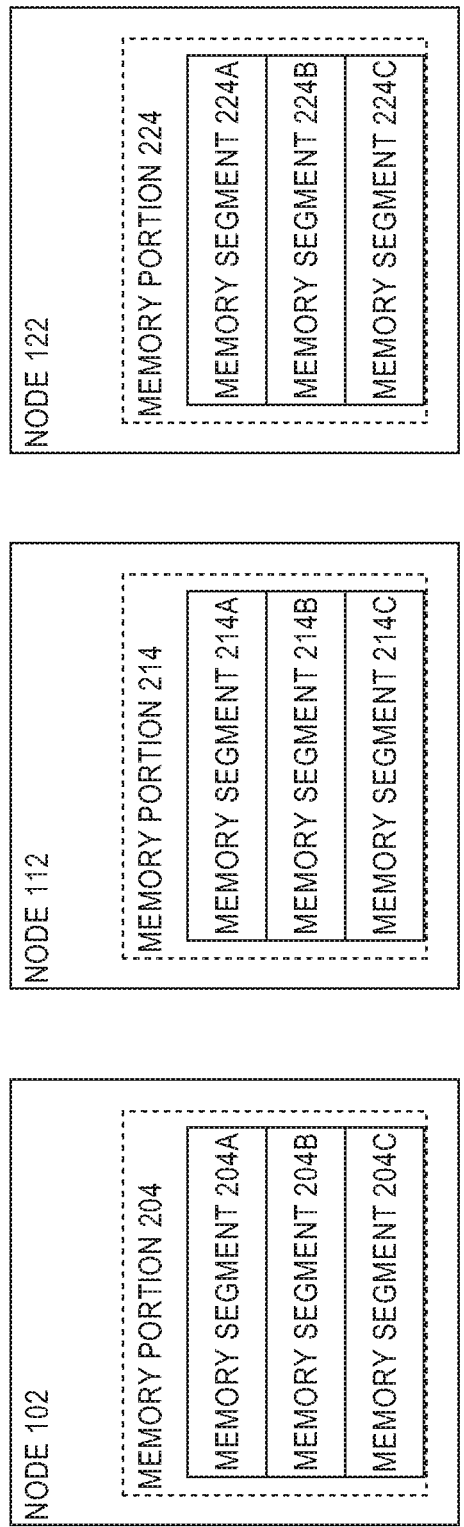
FIG. 2 is a block diagram illustrating memory portions for storing temporary tables.

A portion of the local memory for each node may be used to store in-memory CDT data. FIG. 2 illustrates the CDT memory portions in local memory of nodes in the database system. Local memory 104, 114, and 124 comprise memory portion 204, 214, and 224, respectively. In an embodiment, memory portions 204, 214, and 224 are allocated on start-up of the respective nodes 102, 112, and 122 for storing in-memory CDTs. While in the illustrated embodiment each local memory comprises a single memory portion, in alternative embodiments, a node may have more or fewer memory portions.

Memory portions 204, 214, and 224 may be directly accessed by processes running on the respective nodes. For example, memory portion 204 may be used by a process running on processor 108. Similarly, memory portion 214 may be used by a process running on processor 118.

In an embodiment, memory portion 204, 214, and 224 are further divided into a plurality of memory segments. Each memory segment may be assigned to a process running on the node the memory portion belongs to. Each node may have a different number of memory segments and the memory segments may be of different sizes. In the present example, memory portion 204 comprises memory segments 204a, 204b, and 204c; memory portion 214 comprises memory segments 214a, 214b, and 214c; and memory portion 224 comprises memory segments 224a, 224b, and 224c.

In an embodiment, one or more portions of shared disk 150 are also used to store in-memory CDT data. The portions may be allocated when the database system starts, or may be allocated on an as-needed basis during query processing.

The one or more disk portions may be further divided into a plurality of disk segments. In an embodiment, a disk segment is allocated and assigned to a process writing in-memory CDT data when the CDT data requires more space than an assigned memory segment can hold. In another embodiment, each process writing in-memory CDT data is assigned a disk segment at the start of writing in-memory CDT data, regardless of the size of the CDT data.

Iterative Operations

A query may include one or more iterative database query operations. As used herein, an iterative operation refers to a query operation that is executed a number of times, such as a recursive operation. Certain computational tasks are performed using recursive operations, such as frequent item set determination and graph traversal.

FIG. 3 illustrates an example query that includes an iterative operation. For the purpose of illustration, assume table T represents the edges of a directed graph, and includes columns "fid," "tid," and "cost." The "fid" column of a row indicates the starting point of an edge in the graph, the "tid" column indicates the end point of the edge, and the "cost" column indicates a distance or cost for traversing the edge. A database instance may receive query 300, which traverses the graph represented by table T and outputs the cost of paths between nodes in the graph.

In the illustrated example, query 300 includes a recursive WITH clause "rw." As used herein, a WITH clause is a database statement that provides an alias for a sub-query comprising one or more database operations. For example, if a query includes a particular sub-query multiple times, a user may define a WITH clause that includes the sub-query. The query may be written to reference the WITH clause rather than repeat the contents of the sub-query multiple times. In an embodiment, an execution plan for a query that includes a WITH clause may define and create a temporary table for the WITH clause. Plan operations that include the WITH clause may refer to the temporary table.

A recursive WITH clause is a WITH clause that references itself. In an embodiment, an execution plan for a query that includes a recursive WITH clause may define and create a temporary table for the recursive WITH clause. Each iteration of the recursive WITH clause uses the same temporary table to load and store data.

Based on the components of query 200, the query coordinator generates an execution plan for executing the query. In an embodiment, the execution plan for a query that includes an iterative operation comprises at least three stages: an initialization stage, an iterative stage, and a finalization stage.

The initialization stage executes a single time. The initialization stage may include loading data to be used during execution of subsequent stages. In the present example, the initialization stage for query 200, indicated by section 310, includes scanning table T, selecting rows where the "fid" column equals 1, and storing the results in a temporary table.

The iterative stage includes one or more iterative operations. The iterative stage may end after a particular number of iterations or when a particular exit condition is reached. In an embodiment, the execution plan indicates that the iterative operations repeat, but may not indicate the number of iterations. The number of times an iterative operation iterates may not be determined until execution of the iterative stage completes.

In the present example, the iterative stage, indicated by section 320, includes executing the recursive WITH clause "rw" and storing the results for each iteration in the temporary table. At the end of an iteration, any exit conditions are checked to determine whether to execute another iteration or to proceed to the finalization stage. In the present example, clause "rw" repeats while T.fid equals rw.TID or while the variable "count" is less than 10.

In an embodiment, the initialization stage and each iteration of the iterative stage is associated with an iteration value. The iteration value may be a number, string, or some other value that indicates a current iteration. For example, the initialization stage may be considered the initial iteration and is associated with an iteration value of 0. The first iteration of the iteration stage is then associated with an iteration value of 1 and the second iteration of the iteration stage associated with an iteration value of 2, such that the $N^{th}$ iteration of the iteration stage is associated with iteration value of N.

An iteration may require data that was generated and stored for one or more prior iterations. For example, iteration N may require data from the last iteration N−1, some other prior iteration K, or a set of iterations, such as iterations L through N−1. In an embodiment, row of the temporary table are associated with a respective iteration value. Storing data in the temporary table may include storing the iteration value associated with an iteration. Techniques for associating data in a temporary table with one or more iteration values is discussed in further detail below.

As illustrated in FIG. 3, recursive WITH clause "rw" includes an iterative operation that calls another iteration of clause "rw:"

SELECT rw.fid, T.tid, rw.cost+T.cost, rw.count+1
FROM T, rw

Thus, each iteration of "rw" requires data (rw.fid, rw.cost, and rw.count) generated by the previous iteration of "rw." In other words, for an iteration N of clause "rw," the iteration requires data stored for iteration N−1. Rows generated by an iteration of "rw" may be stored with an iteration value that indicates its iteration number.

The finalization stage may include additional query operations on data stored in the temporary table and outputting a set of one or more results. In the present example, the finalization stage includes grouping all rows of the temporary table by the "fid" and "tid" columns, aggregating the "count" and "cost" columns for each group, and outputting the results.

Although the present example is described using recursive WITH, the techniques described herein can be used with other recursive operations, such as frequent item sets and connect by, or by non-iterative operations that request results generated by other query operations.

Associating Data with Iteration Values

If a row is associated with an iteration value, then data stored in a temporary table for that row may be associated with the iteration value. As discussed in the In-Memory application, data for a temporary table is stored in one or more memory portions and/or one or more disk portions. In an embodiment, a memory portion and a disk portions may be further divided into one or more memory segments and one or more disk segments, respectively. For the purpose of illustrating a clear example, techniques are described with reference to segments, but may be used with portions, blocks, or any other level of granularity.

In an embodiment, each memory segment or disk segment is associated with one or more iteration values of the data stored in each respective memory portion or disk portion. If a segment stores data for a single iteration, then it is associated with a single iteration value. If a segment stores data for multiple iterations, then it is associated with multiple iteration values. For example, if a memory segment stores data from iteration 4 and iteration 5, then the memory segment is associated with the iteration values for iteration 4 and iteration 5. If a memory segment only stores data for iteration 2, then it is associated only with the iteration value for iteration 2. A segment may be associated with one or more iteration values, and an iteration value may be associated with one or more segments. The number of iterations associated with a segment may vary depending on the size and number of rows for an iteration and the size of the segment.

In an embodiment, the database system stores a data structure that indicates segment information for a temporary table. The data structure may include information about the number of segments, the size and location of each segment, and one or more iteration values associated with each portion. In an embodiment, the database system stores a data structure for memory segments and a separate data structure for disk segments. In other embodiments, the data structure indicates both disk and memory segments.

In an embodiment, after a slave process writes data to a segment, it indicates in the data structure a segment ID, an iteration value to associate with the segment, and the start and end location for the iteration value. For example, the data structure may indicate the starting block number and an ending block number within a segment for a set of data blocks.

Pruning Using Iteration Values

An iteration may require data stored in the temporary table from one or more previous iterations. Rather than reading the entire temporary table and filtering rows from the results, the temporary table may be pruned so that only the data for the relevant iteration(s) is read. Prior to reading a row from the temporary table, the database system determines if the iteration value associated with the row matches an iteration value associated with one or more requested iterations.

In an embodiment, each memory segment or disk segment is associated with one or more iteration values. Prior to reading data from a segment, the database system determines if at least one of the one or more iteration values of the segment is an iteration value associated with a requested iteration. In an embodiment, the data structure indicating segment information is used to determine which segments include data associated with the one or more requested iteration values.

In an embodiment, the slave processes each select a particular memory segment or disk segment to read. A slave process may select a segment to read based on the segment information stored in the data structure. In an embodiment, a slave process determines, based on one or more iteration value associated with a segment in the data structure, whether the segment includes data for a desired iteration. If the segment contains data for a desired iteration, the slave process reads from the segment.

In an embodiment, the data structure indicates the start and end location within a segment that stores data for an iteration. A slave process may select a segment and read only from the portion of the segment that stores data for a requested iteration. For example, if blocks 150 to 2000 of a segment store data for a requested iteration, then a slave process may generate a work granule that includes reading from block 150 to block 950. The slave process may indicate the location it read to. Another slave process may generate a work granule that reads from block 951 to block 2000.

In an embodiment, the database system also generates and stores a column in the temporary table indicating an iteration value for a row. After data is read from the temporary table, the rows may be filtered based on the iteration value column. If a row that is not associated with the requested iteration is read, then it will still be filtered out. In an embodiment, the iteration value stored in the column may be based on the iteration value stored in the data structure, but may use a different set of values or a different data type. For example, the iteration value stored in the column may be an integer from 0 to N, while the iteration value stored in the data structure may be a string from "itr_1" to "itr_(N+1)."

DBMS Overview

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMS's, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database, as well as other kinds of operations. A database command may be in the form of a database statement that conforms to a database language. A database language for expressing the database commands is the Structured Query Language (SQL). There are many different versions of SQL, some versions are standard and some proprietary, and there are a variety of extensions. Data definition language commands are issued to a database server to create or configure database objects, such as tables, views, or complex data types. DDL commands are used to configure a database server for a particular hardware environment, to configure computer resource usage of the database server, as well as other operating aspects of the database server.

A multi-node database management system is made up of interconnected nodes that share access to the same database or databases. Typically, the nodes are database server hosts interconnected via a network and share access, in varying degrees, to shared storage, e.g. shared access to a set of disk drives and data blocks stored thereon. Each node in a multi-node database system hosts a database server. A server, such as a database server, is a combination of software and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to as a "server instance" or "instance." A database server may comprise multiple database instances, some or all of which are running on separate computers, including separate server blades.

The term process refers to a computer system process, which is described below in the HARDWARE OVERVIEW. Processes that comprise a database server run under the control of the database server (i.e. can be created or terminated by the database server) and perform various database server functions. Such processes are referred to herein as database server processes. Database server processors include listeners, garbage collectors, log writers, "server processes" for database sessions for executing database commands issued by database clients (including processes executing within shared sessions), and recovery processes.

Data Blocks

A data block is a unit of persistent storage and is used by a database server to store one or row more database rows, or portions of rows, including one or more columns of a row. When rows are read from persistent storage, a data block containing the row is copied into a data block buffer in RAM and/or main memory of a database server. A data block usually contains multiple rows, and data block metadata describing the contents of the data block. Metadata includes control and formatting information, such as offsets to sequences of bytes representing rows or other data structures, and a list of transactions affecting a row.

A data block is referred to as being atomic because, at least in part, a data block is the smallest unit of database data a database server may request from a persistent storage device. For example, when a database server seeks a row that is stored in a data block, the data block may only read the row from a persistent storage device by reading in the entire data block.

A data block is associated with a data block address that uniquely identifies the data block and the data block's storage location within a storage device. A database server may request from a storage device a data block by data block address, or even by primary block address ranges of data blocks.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
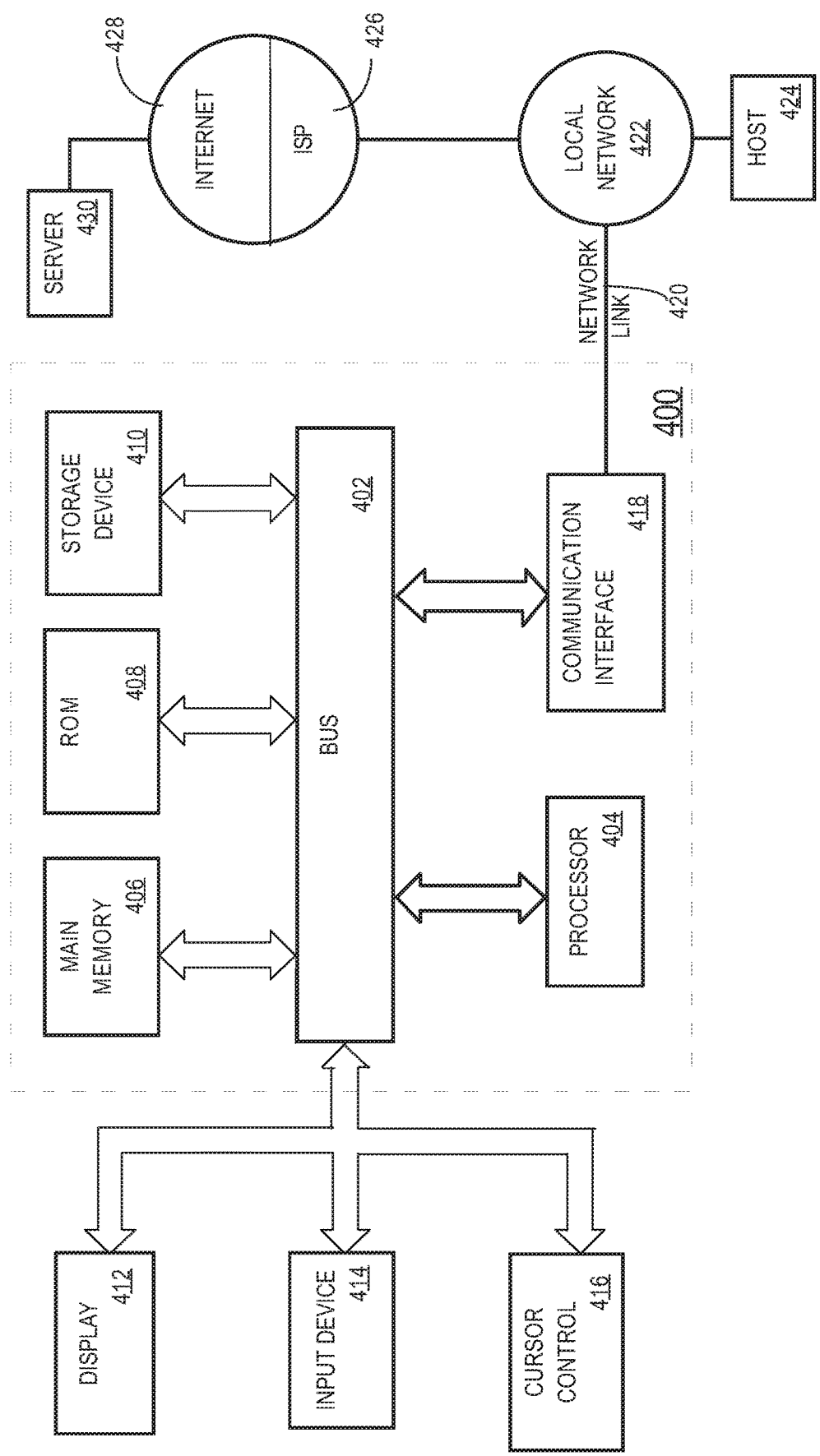
FIG. 4 is a block diagram illustrating a computer system that may be used to implement the techniques described herein.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for processing a query on a multi-node database system against a shared database, the method comprising:
    creating an in-memory temporary table for storing intermediate results for the query, wherein said in-memory temporary table comprises multiple table segments;
    wherein an execution plan for said query comprises multiple query plan operations, said multiple query plan operations including a first query plan operation and an iterative query plan operation that is executed in multiple iterations, wherein:
    said first query plan operation includes reading data from a certain table and storing results generated by said first query plan operation in one or more table segments of said multiple table segments wherein the one or more table segments are associated with an initial iteration of said multiple iterations;
    executing said iterative query plan operation in subsequent iterations of said multiple iterations, wherein for each iteration of said subsequent iterations:
    determining one or more particular table segments of said multiple table segments associated with one or more previous iterations of said each iteration;
    reading results generated during the one or more previous iterations of said each iteration from said one or more particular table segments associated with the one or more previous iterations of said each iteration to execute said iterative query plan operation;
    storing results of executing said iterative query plan operation generated during said each iteration in one or more respective table segments of said multiple table segments; and
    associating said one or more respective table segments of said multiple table segments with said each iteration;
    determining an iteration value in association with said each iteration; and
    storing said iteration value in association with said results generated during said each iteration.

2. The method of claim 1, wherein executing said execution plan includes multiple processes executing said iterative query plan operation in parallel.

3. The method of claim 1, wherein executing said iterative query plan operation further comprises, for each iteration of said subsequent iterations:
    determining a respective one or more iteration values associated with said one or more previous iterations of said each iteration; and
    determining said one or more particular table segments associated with said one or more previous iterations of said each iteration based on the respective one or more iteration values.

4. The method of claim 1 wherein executing said iterative query plan operation further comprises, for each iteration of said subsequent iterations:
    determining a respective one or more iteration values associated with said one or more previous iterations of said each iteration;
    determining one or more memory segments associated with said one or more previous iterations of said each iteration based on said respective one or more iteration values; and
    reading said one or more particular table segments associated with said one or more previous iterations of said each iteration from said one or more memory segments.

5. The method of claim 1, wherein said multiple table segments are stored in one or more memory segments in memory of nodes in the multi-node database system and wherein executing said iterative query plan operation further comprises, for each iteration of said subsequent iterations:
    storing results generated during said each iteration in one or more memory segments in association with said each iteration; and
    storing data that associates said one or more memory segments with said iteration value in association with said each iteration.

6. The method of claim 5, wherein storing data that associates said one or more memory segments with said iteration value further comprises, for each memory segment of said one or more memory segments:
    storing data that associates a respective starting location in said each memory segment with an iteration value; and
    storing data that associates a respective ending location in said each memory segment with an iteration value.

7. The method of claim 6, wherein for each iteration of said subsequent iterations, reading said one or more particular table segments further comprises:
    for each particular iteration value associated with said one or more previous iterations of said each iteration:
    determining one or more memory segments associated with said each iteration value;
    determining a respective starting location and a respective ending location associated with said each particular iteration value; and reading from said respective starting location to said respective ending location.

8. One or more non-transitory computer-readable media storing instructions for processing a query on a multi-node database system against a shared database, wherein the instructions include:
    instructions which, when executed by one or more hardware processors, cause creating an in-memory temporary table for storing intermediate results for the query, wherein said in-memory temporary table comprises multiple table segments;
    wherein an execution plan for said query comprises multiple query plan operations, said multiple query plan operations including a first query plan operation and an iterative query plan operation that is executed in multiple iterations, wherein:
    said first query plan operation includes reading data from a certain table and storing results generated by said first query plan operation in one or more table segments of said multiple table segments wherein the one or more table segments are associated with an initial iteration of said multiple iterations;
    instructions, which when executed by one or more hardware processors, cause executing said iterative query plan operation in subsequent iterations of said multiple iterations, wherein for each iteration of said subsequent iterations:
    determining one or more particular table segments of said multiple table segments associated with one or more previous iterations of said each iteration;

reading results generated during the one or more previous iterations of said each iteration from said one or more particular table segments associated with the one or more previous iterations of said each iteration to execute said iterative query plan operation;

storing results of executing said iterative query plan operation generated during said each iteration in one or more respective table segments of said multiple table segments; and associating said one or more respective table segments of said multiple table segments with said each iteration;

determining an iteration value in association with said each iteration; and storing said iteration value in association with said results generated during said each iteration.

9. The one or more non-transitory computer-readable media of claim 8, wherein executing said execution plan includes multiple processes executing said iterative query plan operation in parallel.

10. The one or more non-transitory computer-readable media of claim 8, determining a respective one or more iteration values associated with said one or more previous iterations of said each iteration; and determining said one or more particular table segments associated with said one or more previous iterations of said each iteration based on the respective one or more iteration values.

11. The one or more non-transitory computer-readable media of claim 8 wherein executing said iterative query plan operation further comprises, for each iteration of said subsequent iterations:

determining a respective one or more iteration values associated with said one or more previous iterations of said each iteration;

determining one or more memory segments associated with said one or more previous iterations of said each iteration based on said respective one or more iteration values; and reading said one or more particular table segments associated with said one or more previous iterations of said each iteration from said one or more memory segments.

12. The one or more non-transitory computer-readable media of claim 8, wherein said multiple table segments are stored in one or more memory segments in memory of nodes in the multi-node database system and wherein executing said iterative query plan operation further comprises, for each iteration of said subsequent iterations:

storing results generated during said each iteration in one or more memory segments in association with said each iteration; and storing data that associates said one or more memory segments with said iteration value in association with said each iteration.

13. The one or more non-transitory computer-readable media of claim 12, wherein storing data that associates said one or more memory segments with said iteration value further comprises, for each memory segment of said one or more memory segments:

storing data that associates a respective starting location in said each memory segment with an iteration value; and storing data that associates a respective ending location in said each memory segment with an iteration value.

14. The one or more non-transitory computer-readable media of claim 13 wherein for each iteration of said subsequent iterations, reading said one or more particular table segments further comprises:

for each particular iteration value associated with said one or more previous iterations of said each iteration:

determining one or more memory segments associated with said each particular iteration value;

determining a respective starting location and a respective ending location associated with said each particular iteration value; and reading from said respective starting location to said respective ending location.

\* \* \* \* \*